Figure 1:
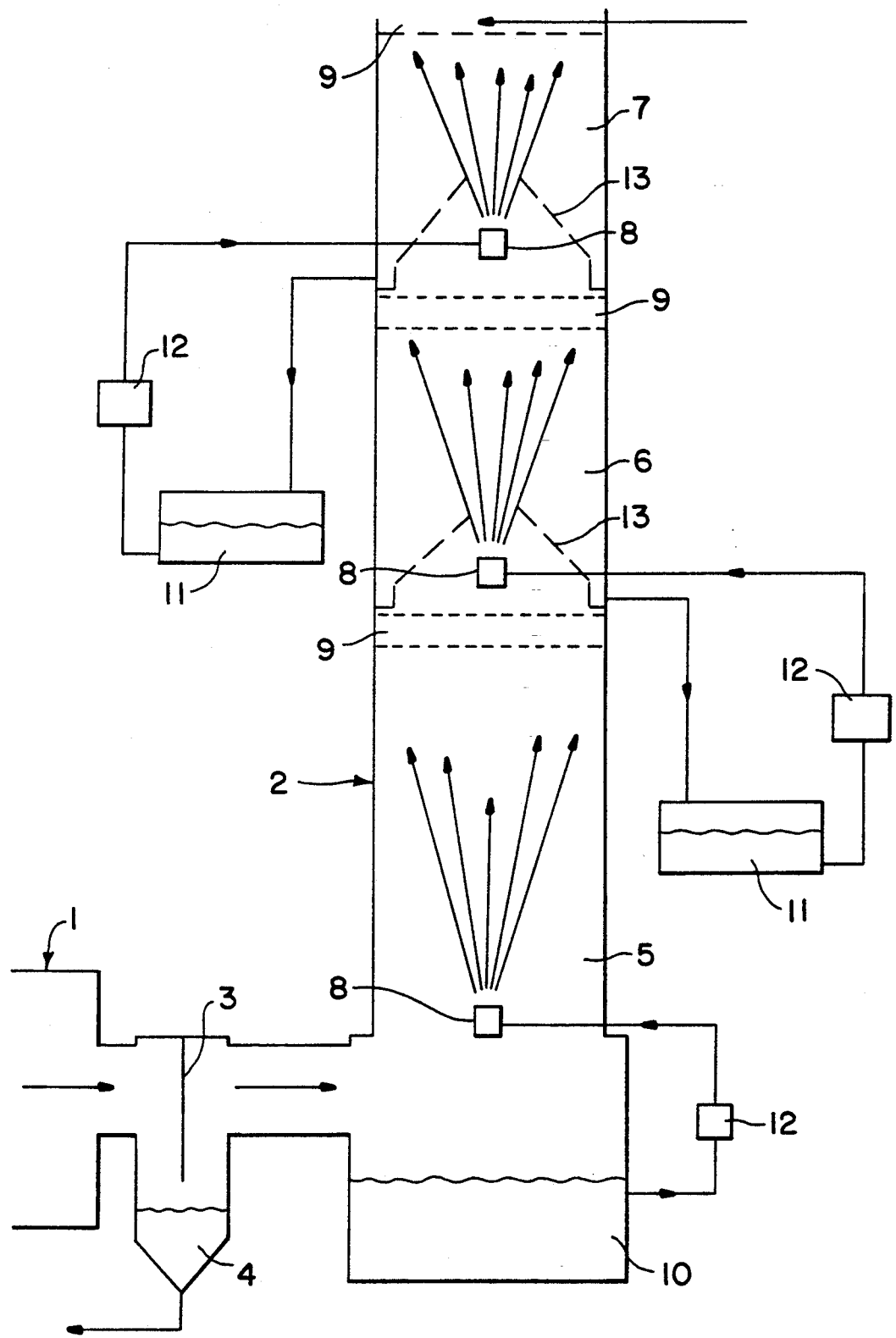

United States Patent [19]

Nevels

[11] Patent Number: 5,186,916
[45] Date of Patent: Feb. 16, 1993

[54] METHOD FOR PURIFYING FLUE-GASSES

[76] Inventor: Leonardus M. M. Nevels, Daalzicht 37, 6097 EK Heel, Netherlands

[21] Appl. No.: 594,821

[22] Filed: Oct. 5, 1990

[30] Foreign Application Priority Data

Oct. 6, 1989 [NL] Netherlands ............ 8902490

[51] Int. Cl.$^5$ .................................. B01D 47/02
[52] U.S. Cl. ............................ 423/210; 210/748; 210/749; 210/765; 423/212; 423/215.5; 423/219; 423/220; 423/226; 423/235; 423/245.2; 423/246; 423/240 R; 423/242.2; 423/242.1
[58] Field of Search ......... 423/235, 240, 242, 243, 423/219, 246, 220, 226, 238, 245.2, 212, 215.5, 210; 210/748, 749, 765

[56] References Cited

U.S. PATENT DOCUMENTS

| | | | |
|---|---|---|---|
| 3,836,987 | 9/1974 | Gibbons et al. | 354/300 |
| 3,923,954 | 12/1975 | Petrey et al. | 423/235 |
| 4,053,555 | 10/1977 | Bolme | 423/235 |
| 4,081,509 | 3/1978 | Hishinuma et al. | 423/235 |
| 4,212,853 | 7/1980 | Fukui | 423/235 |
| 4,294,928 | 10/1981 | Tamony et al. | 423/235 |
| 4,647,441 | 3/1987 | Heiting | 423/235 |
| 4,879,102 | 11/1989 | Hoppe et al. | 423/235 |

FOREIGN PATENT DOCUMENTS

| | | |
|---|---|---|
| 0017796 | 10/1980 | European Pat. Off. . |
| 0063560 | 10/1982 | European Pat. Off. . |
| 0217437 | 4/1987 | European Pat. Off. . |
| 0243889 | 11/1987 | European Pat. Off. . |
| 2244398 | 3/1973 | Fed. Rep. of Germany . |
| 2847920 | 5/1980 | Fed. Rep. of Germany . |
| 3725715 | 2/1989 | Fed. Rep. of Germany . |
| 2181988 | 12/1973 | France . |
| WO 88/06140 | 8/1988 | PCT Int'l Appl. . |

OTHER PUBLICATIONS cf. Gladky A. V. Prostiye metody ochistki ot dioksida sery dymovykh gasov elektrostantsi bez utilizatsii ulovlelnnykh produktov., Mocsow, TsINTIKhlMNEFTEMASH, 1988, p. 15.

*Primary Examiner*—Wayne Langel
*Attorney, Agent, or Firm*—Foley & Lardner

[57] ABSTRACT

A method for purifying flue-gasses and other hot, oxidative waste gasses originating from industrial installations, combustion furnaces, engines and the like, whereby the hot gas to be purified is passed through at least one spraying chamber or -area and is contacted therein with a gas washing liquid, which is sprayed into the hot gas flow and cools the gas to below 100° C., whereby residual liquids with a high C.Z.V.-value, which comprise complex builders, compounds of heavy metals, sulphur- and nitrogen compounds, and originating amongst others from fixing-baths and the like from the photographic, photochemical and galvanic industries, are used as gas washing liquid.

10 Claims, 2 Drawing Sheets

METHOD FOR PURIFYING FLUE-GASSES

The invention relates to a method for purifying flue-gasses and other hot, oxidative waste gasses originating from industrial installations, combustion furnaces, engines and the like.

Flue-gasses originating from fireplaces, engines, factories, etc., in general comprise solid matter (fly gas), gaseous compounds and vapours. In such flue-gasses numbers of ten of heavy metal compounds, acidic gasses such as HBr, Hcl, HF, $SO_2$, $NO_x$, and gasses such as $N_2$, $O_2$, CO and $CO_2$ are often found.

A thus loaded flue-gas constitutes a heavy burden to the environment on direct discharge to the environment in connection with amongst others "acidic rain" (e.g. by sulphurdioxide and ammonia), "hothouse effect" ($CO_2$), soil pollution (e.g. by dioxines), and ground water pollution. Fly ash can moreover be extremely harmful in connection with mist formation (smog), whereby the whole atmosphere may become laden with substances which are harmful to health and are often even very poisonous. It is for that reason desirable and often coercively regulated, that such flue-gasses should be purified before they are released to the atmosphere.

In practice dust is removed thereby by means of cyclones, filters, fabric filters and electrostatic filters. Filtering is carried out after the temperature has decreased to about 300° C. or less. Slowly cooling of gasses from ±1200° C. to 300° C. causes the formation of a.o. dioxines and benzofurans.

Gaseous components are washed out by means of washing with a liquid, comprising lime. Also in fireplaces lime is often injected in order to bind for example $SO_2$ in this way. Occasionally alkali is used as a reaction agent. The gas washing liquid is discharged directly or after treatment. Possible slurries are dumped.

Such a manner of purifying flue-gasses has the disadvantage that no complete purification is achieved, and that still many deleterious substances, metal compounds, gasses, etc., will be released to the atmosphere and to the environment. Moreover, especially for the combustion of waste, there is the serious problem of dioxines, which are released while slowly cooling the flue-gasses. In addition the gas washing liquid itself may constitute a new burden to the environment.

It is now the object of the invention to provide a method for purifying flue-gas, loaded with dust and acidic gasses, whereby a substantially complete purification can take place and the problems with respect to the environment have been reduced to a minimum.

To that end the invention provided a method for purifying flue-gasses, as described in the introduction, characterised in that the hot gas to be purified is passed through at least one spraying chamber for -area, and is brought into contact therein with a gas washing liquid, which is sprayed into the hot gas flow and cools the gas to less than 100° C., whereby as gas washing liquid residual liquids with a high C.Z.V.-value (chemical oxygen consumption value) are sued, which comprise complex builders, compounds of heavy metals, sulphur- and nitrogen compounds, and which originate amongst others from fixing baths and the like from the photographic, photochemical and galvanic industries.

As residual liquids can be considered a.o.

a) residual liquids obtained by partially demetallizing photographic baths (fixing-developer-stopbaths), b) residual liquids obtained after an ONO-treatment of galvanic baths, c) residual liquids comprising complex building compounds, such as fluoroboric acid, EDTA (ethylenedinitrilotetrascetate), silicofluorides, and the like.

In the related Dutch patent application No. 8902489, of the same applicant and of the same rank, a method is suggested for processing such residual liquids by spraying the residual liquid to be treated into a hot, oxidizing gas flow, originating from industrial installations, combustion furnaces, and the like, and to treat the condensate collected further for the removal of heavy metals, sulphur compounds, and the like therefrom.

It has now been found that in reverse by such a treatment with such a residual liquid as gas washing liquid the hot, oxidizing gas can be stripped of heavy metals, sulphur compounds and other impurities. By the intensive mixing with the residual liquid, used as washing liquid, the power of the gas flow is used for the formation of vapour, fly gas, and a part of the gasses supplied are taken up into the washing liquid, and numerous reactions take place, whereby a.o. insoluble compounds are formed, which settle in the lower part of the spraying chamber or gas washing reactor. Thereby oxidation-reduction processes occur, as described in said Dutch patent application. As a consequence thereof a purification of the flue-gas takes place, whereby substances to be removed in part precipitate, i part dissolve in the washing liquid, and in part are converted into less harmful gasses. The saturated vapour, leaving the spraying chamber or gas washing reactor, is loaded with droplets of liquid, which are separated therefrom.

A major advantage of the method according to the invention is, that the hot flue-gasses are rapidly cooled by the spraying of the gas washing liquid from a high temperature to ±60°-70° C., whereby the formation of for example dioxines and benzofurans is prevented.

Another advantage is, that the gas washing liquids, or the residual liquids, used are chemically converted by the intensive contact with the oxidizing flue-gas in such a way, that the impurities, harmful to the environment, can be removed in the manner as described in the said Dutch patent application. Thus a twofold object is achieved, for on the one hand a highly polluted flue-gas is purified, on the other hand a residual liquid of for example a fixing-bath can be converted at the same time into such a form, that is can be decomposed further to substances which are not harmful to the environment.

In the method according to the invention spraying of the gas washing liquid is preferably carried out in such a way, that the gas to be purified is cooled to 60°-70° C.

Efficiently the gas, saturated with washing liquid, is passed from the spraying chamber to a liquid-vapour separator, and the separated washing liquid is recirculated and again sprayed into the hot gas flow.

Thereby the recirculation stream of gas washing liquid is efficiently passed through purification stages, where various components are decomposed and removed.

As already described in patent application No. 8902489 the recirculation stream of gas washing liquid may thereby be subjected to electrolysis and cementation by means of iron, whereby heavy metals can be precipitated, and the pH of the recirculation stream can be increased to over 5 for the precipitation of hydroxides of heavy metals, preferably by the addition of calcium hydroxide.

For the precipitation of silver a halogenide may further be added to the gas washing liquid. In general the flue-gas itself will contain adequate halogenide.

By adding calcium- and nitrate ions to the gas washing liquid, which is sprayed into the flue-gas, an efficient means is provided for removing deleterious gasses, such as sulphurdioxide and ammonia. In the presence of ions of heavy metals, such as $Cu^{++}$, $Fe^{+++}$, $Ag^+$ and the like, $SO_2$ dissolved in the washing liquid can be converted into $SO_4$-ions, which subsequently precipitate with calcium according to the following reaction scheme:

$$SO_2 + \text{oxidizer} + (\text{kat}.Cu^{++} \ Fe^{+++} \ Ag^+ \ \text{enz.}) \rightarrow SO_3$$

$$SO_3 + H_2O \rightarrow 2H^+ + SO_4^{11}$$

$$SO_4^{11} + Ca^{++} \rightarrow CaSO_4 \downarrow$$

Apart from calcium sulfate lead sulfate may precipitate as well according to the reaction $SO_4 + Pb^{++} \rightarrow PbSO_4 \downarrow$. Thus lead ions, originating from the hot flue-gas, can be removed in an efficient manner.

Ammonia, in the residual liquid converted into ammonium ions react with the nitrate ions of the residual liquid according to $$NH_4^+ + NO_3^- \rightleftharpoons NH_4NO_3 \xrightarrow[\text{kat}]{T \geq 100} N_2 \uparrow + 2H_2O + \tfrac{1}{2}O_2 \uparrow ,$$

whereby the evolving oxygen contributes to the further decomposition by oxidation of the complex compounds of the residual liquid.

In the residual liquids, used as gas washing liquids, there are usually EDTA-complexes, which are gradually oxidized by oxidizing substances from the gas flow, and the $Fe^{+++}$, $Cu^{++}$, $Hg^+$, $Ni^{++}$ and $Ag^+$ ions are of importance for the further catalytic oxidations.

It is advisable in particular in connection with EDTA-complexes, that an excess of free $Fe^{+++}$ ions is present. This forms the most stable EDTA-complex, and thereby the relevant metals can be released from other metal-EDTA complexes. Decomposition of EDTA occurs thereby according to the reaction scheme:

Metal complex with $EDTA = MeH_2.EDTA$ $MeH_2.EDTA \rightleftharpoons Me^{++} + H_2.EDTA$ $H_2.EDTA + \text{oxydizer} + \text{kat} \rightarrow N_2 \uparrow + xCO_2 \uparrow + yH_2O$ The method according to the invention is preferably carried out in a number of gas washing stages. Thereby the hot flue-gas to be purified is prepurified in a first washing stage and cooled to less than 100° C. and is subsequently passed through a cascade of superimposed washing stages, whereby each washing stage has its own gas washing liquid recirculation and the temperature of the flue-gas is gradually decreased to 50°-60° C. The gas that eventually has passed all stages can be discharged to the atmosphere without any objection.

Figure 2:
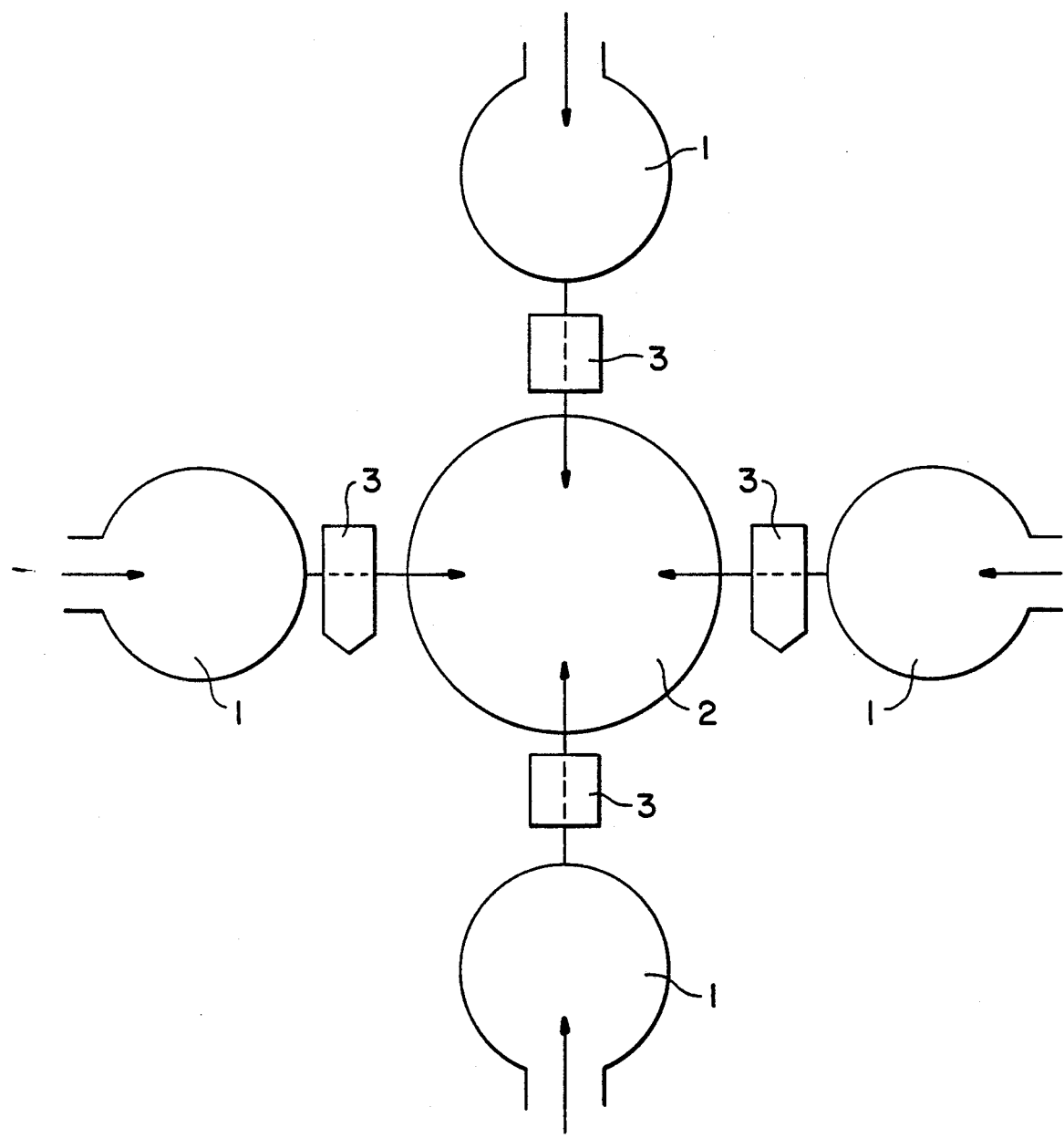

The invention will be further elucidated by means of a gas washing reactor system, suitable for the method according to the invention, with reference to the drawing. In the drawing:

FIG. 1 shows diagrammatically a device for application of the method according to the invention, with a first washing stage, connected to a central washing column wherein a number of washing stages have been superimposed, and FIG. 2 shows diagrammatically in top view such a central washing column with a number of first washing stages connected thereto.

In FIG. 1 is shown in a diagrammatic side view a reactor system for purifying flue-gas by gas washing according to the method according to the invention. The system has a central washing column 2, to which a wash reactor 1, forming the first washing stage of the system, is connected by way of a liquid-vapour separator 3. Below the liquid-vapour separator 3 is a washing liquid drain 4, which is connected to a recirculation- and purification system of gas washing liquid.

The central washing column 2 consists of a number of superimposed washing stages, in the example shown the washing stages 5, 6 and 7. Each one of these washing stages has at the bottom side a sprayer for gas washing liquid, in the example shown venturi jet pipes 8. Each washing stage is separated from the subsequent one at its upper end by a drop collector 9.

Under the lower washing stage 5 of the central washing column 2, which constitutes the second washing stage of the total system, is a tank for washing liquid, and the remaining stages 6 and 7 each have separate washing liquid tanks 11. Each one of these washing liquid tanks is incorporated into a recirculation system, whereby pumps 12 take care of the recirculation.

In the lower washing stage the draining liquid is directly collected again in the tank 10. in the washing stages located thereabove venturi trays 13 take care, that the draining liquid is returned by way of a side drain to the relevant tank 11.

This device operates as follows:

Flue-gas is passed through the first washing reactor 1, which is not shown in detail, and is contacted in the reactor, as described in above, with a gas washing liquid, for example consisting of residual fixing liquid of a fixing-bath. As a consequence of the oxidation-reduction processes taking place between the gas washing liquid and the flue-gas, a prepurification of the flue-gas takes place, while the liquid 4 draining from the liquid-vapour separator 3 is recirculated and purified. In this manner simultaneous prepurification of the flue-gas as well as purification and decomposition of the residual fixing liquid, which is used in this example as washing liquid, can be achieved.

The prepurified flue-gas, laden with vapour, subsequently enters into the central washing column 2 into the lower (second) washing stage 5 and comes there into contact with washing liquid, which is sprayed upward into the gas by way of the venturi jet pipe 8. Thereby a further purification occurs by chemical reactions, and the drop collector 9 of the lower stage 5 allows the excess of liquid to drip back onto the tank 10. The flue-gas rises, carried along by the upward directed jet from the venturi jet pipe 8, and enters into the following washing stage 6, where a similar gas treatment takes place by means of the venturi jet pipe 8 and the circulation system of tank 11 and pump 12.

In this washing stage 6 and in the washing stage 7 subsequent thereto, are moreover venturi trays 13, which cause that the liquid coming from the drop collector 9 reenters the circulation system for the washing liquid of that stage, thus assuring a constant circulation.

The gas is again carried along upward to the following stage, where a similar treatment takes place. At the upper end of the last washing stage 7 a water shower is positioned above the drip collector 9, which causes additional cooling of the gas, that has been cooled already in the meantime.

The liquids of the second, third and fourth stages respectively, 5,6 and 7 respectively in the total system, are treated separately and act after treatment as supplement of the evaporating liquid of the first washing reactor 1. In a practical embodiment the gas throughput of the first washing reactor 1 can amount to 6,000 to 10,000 Nm³/hour.

It is possible to connect more than one first washing reactor 1 to the central washing column. In FIG. 2 a system is shown in diagrammatic top view, wherein four first washing reactors 1 are connected to a central washing column 2, each one separated therefrom by a liquid-vapour separator 3. The advantage of such a system is, that for example in the case of a flue-gas from a furnace, the furnace process can continue, if defects would occur in one of the gas washing reactors 1, which necessitate putting out of action. If one of the washing stages of the central column would stop, the other stages can continue to function in the ordinary manner.

The invention has been elucidated in the above by means of a specific type of washing reactor system. It will be obvious that the invention is not bound to this specific system, and that other systems are also possible for applying the invention.

I claim:

1. A method for purifying flue-gasses and oxidative waste gases exceeding 100° C. and originating from industrial installations, combustion furnaces and engines, comprising the steps of:
   (a) passing said gases through at least one spraying chamber or area;
   (b) and simultaneously spraying a gas washing liquid comprising a residual liquid derived from photographic, photochemical or galvanizing fixing-baths selected from the group consisting of complex builders, heavy metals compounds, sulfur-containing compounds and nitrogen-containing compounds into said chamber or area in order to contact said gas washing liquid with said gases;
   (c) cooling said gases to below 100° C.;
   (d) purifying said gas washing liquid by subjecting said liquid to means for removing noxious components; and thereby
   (e) removing harmful impurities selected from the group consisting of acidic gases, heavy metal compounds, sulfur compounds and dust from said gases;

and wherein said method further provides for the simultaneous purification of said gas washing liquid as a result of said contact of said gas washing liquid with said gases.

2. A method according to claim 1, characterised in that the gas to be purified is cooled by the gas washing liquid to 60°-70° C.

3. A method according to claim 1, characterised in that the gas from the spraying chamber, saturated with washing liquid, is passed through a liquid-vapour separator and the separated washing liquid is recirculated and is again sprayed into the hot gas flow.

4. A method according to claim 3, characterised in that the gas washing liquid of the recirculation stream is subjected to electrolysis and cementation by means of iron.

5. A method according to claim 4, characterised in that the pH of the recirculation stream is increased to over 5 for the precipitation of hydroxides of heavy metals.

6. A method according to claim 5, characterised in that the pH of the recirculation stream is increased by the addition of calcium hydroxide.

7. A method according to claim 1, characterised in that a halogenide is added to the gas washing liquid.

8. A method according to claim 1, characterised in that the gas washing liquid is sprayed into the flue-gas with the addition of calcium- and nitrate ions.

9. A method according to claim 1, characterised in that an excess of $Fe^{++}$ ions is provided in the gas washing liquid.

10. A method according to claim 1, characterised in that the hot flue-gas to be purified is prepurified in a first washing stage and is cooled to less than 100° C. and is subsequently passed through a cascade of superimposed washing stages, whereby each stage has its own gas washing liquid recirculation and the temperature of the flue-gas gradually decreases to 50°-60° C.

* * * * *